(12) United States Patent
Ross

(10) Patent No.: US 7,407,003 B2
(45) Date of Patent: Aug. 5, 2008

(54) GROUND SOURCE HEAT EXCHANGE SYSTEM

(75) Inventor: Mark G. Ross, Amelia, OH (US)

(73) Assignee: 1438253 Ontario Inc., Amelia, OH (US)

( * ) Notice: Subject to any disclaimer, the term of this patent is extended or adjusted under 35 U.S.C. 154(b) by 380 days.

(21) Appl. No.: 10/856,114

(22) Filed: May 28, 2004

(65) Prior Publication Data

US 2005/0006049 A1 Jan. 13, 2005

Related U.S. Application Data

(60) Provisional application No. 60/474,374, filed on May 30, 2003.

(51) Int. Cl.
*G05D 23/00* (2006.01)
*F24J 3/08* (2006.01)

(52) U.S. Cl. .................. 165/295; 165/288; 165/45; 62/260

(58) Field of Classification Search ............... 165/11.1, 165/45, 287, 288, 293, 294, 295, 300; 62/238.6, 62/260; 237/69, 80
See application file for complete search history.

(56) References Cited

U.S. PATENT DOCUMENTS

| 4,062,489 A | 12/1977 | Henderson | |
|---|---|---|---|
| 4,277,946 A * | 7/1981 | Bottum | 62/238.6 |
| 4,336,692 A | 6/1982 | Ecker et al. | |
| 4,344,414 A * | 8/1982 | Balch | 165/45 |
| 4,360,056 A * | 11/1982 | O'Connell | 165/45 |
| 4,466,256 A * | 8/1984 | MacCracken | 62/260 |
| 4,798,239 A * | 1/1989 | Persohn et al. | 165/45 |
| 4,909,312 A * | 3/1990 | Biedenbach et al. | 165/45 |
| 4,911,229 A * | 3/1990 | McElroy | 165/45 |
| 4,912,941 A * | 4/1990 | Buchi | 62/260 |
| 5,081,848 A * | 1/1992 | Rawlings et al. | 165/45 |
| 5,224,357 A | 7/1993 | Galiyano et al. | |
| 5,244,037 A * | 9/1993 | Warnke | 165/45 |
| 5,261,251 A | 11/1993 | Galiyano | |
| 5,461,876 A * | 10/1995 | Dressler | 62/260 |
| 5,477,914 A | 12/1995 | Rawlings | |
| 5,533,355 A | 7/1996 | Rawlings | |
| 5,669,224 A | 9/1997 | Lenarduzzi | |
| 5,706,888 A * | 1/1998 | Ambs et al. | 165/45 |
| 5,758,514 A | 6/1998 | Genung et al. | |
| 5,964,402 A * | 10/1999 | Jakobson | 237/69 |
| 5,992,507 A * | 11/1999 | Peterson et al. | 165/45 |
| 6,338,381 B1 * | 1/2002 | McClung, III | 165/45 |
| 6,585,036 B2 | 7/2003 | Amerman et al. | |
| 6,761,135 B1 * | 7/2004 | Becktold | 237/80 |

* cited by examiner

*Primary Examiner*—Ljiljana (Lil) V Ciric
(74) *Attorney, Agent, or Firm*—Hamilton, Brook, Smith & Reynolds, P.C.

(57) ABSTRACT

A ground source heat exchange system includes an upstream manifold and a downstream manifold. More than one heat exchange flow circuit can be connected to the upstream and downstream manifolds for burial in the ground. A control valve associated with each heat exchange flow circuit is mounted on at least one of the manifolds. Each control valve controls flow of heat exchange fluid through a respective heat exchange flow circuit.

19 Claims, 3 Drawing Sheets

GROUND SOURCE HEAT EXCHANGE SYSTEM

RELATED APPLICATION

This application claims the benefit of U.S. Provisional Application No. 60/474,374, filed May 30, 2003. The entire teachings of the above application are incorporated herein by reference.

BACKGROUND

Ground source heat exchange systems are sometimes used for increasing the efficiency of heat pumps. Typically, such systems circulate antifreeze as a heat exchange fluid within a series of heat exchange circuits formed of tubing. The heat exchange circuits are buried in the ground for heat exchange with the ground. The heat exchange fluid is then pumped through a heat exchanger in the heat pump. The heat exchange circuits are connected between upstream and downstream junctions called headers or knuckles by welding, which are also buried in the ground. The knuckles are in communication with the heat pump via a pair of inlet and outlet lines to and from the heat pump. Installing such systems is labor intensive and requires licensed personnel and specialized equipment for certain tasks due to the inflammability and toxicity of antifreeze. Once the system is installed, imbalances in fluid flow, and the heat exchange efficiency in the heat exchange circuits, can vary depending upon differing soil types, differing depths, backfill voids, or constrictions in the tubing. Typically, leaks in the system at locations buried under the ground are difficult to repair, for example, at the knuckles at the mechanical connection.

SUMMARY

The present invention provides a ground source heat exchange system that can be easily installed, added to, diagnosed, maintained and adjusted for maximum heat exchange efficiency.

The ground source heat exchange system can include an upstream manifold and a downstream manifold. More than one heat exchange flow circuit can be connected to the upstream and downstream manifolds for burial in the ground. A control valve associated with each heat exchange flow circuit is mounted on at least one of the manifolds. Each control valve controls flow of heat exchange fluid through a respective heat exchange flow circuit.

In particular embodiments, the manifolds are manifold blocks. The heat exchange flow circuits can include a length of flexible plastic tubing, for example, ½ inch diameter PEX tubing. Each heat exchange flow circuit can further include compression fittings on opposite ends of the length of tubing for connecting with the upstream and downstream manifolds. Each length of tubing can be filled with a premeasured amount of antifreeze which is sealed within the tubing by the compression fittings until connection with the manifolds.

An input line for filling the system with liquid can be included and an input pressure regulator can be coupled to the input line for regulating entry pressure of the liquid. A pump system in communication with the upstream and downstream manifolds pumps the heat exchange fluid through the system. The pump system can include more than one variable speed pump coupled together in series. A cabinet can be positioned out of the ground and contain the manifolds, pump system and control valves for easy access. An air eliminator can be included for removing air in the system. Temperature monitors can monitor one of upstream and downstream temperatures of the heat exchange fluid in the heat exchange flow circuits. Flow monitors can monitor the flow rate of the heat exchange fluid. The control valves can be electrically controlled. A controller can be in communication with any of the control valves, pump system, temperature monitors and flow monitors for optimizing flow rate and heat transfer. Any one of the air eliminator, temperature monitors, input pressure regulator, flow monitors and the controller can be positioned within the cabinet. A heat pump can receive the heat exchange fluid from the downstream manifold and return the fluid to the upstream manifold. The system can include a flush cart, and the more than one heat exchange flow circuit can include at least one auxiliary heat exchange flow circuit.

The present invention can also include a ground source heat exchange system including an upstream manifold and a downstream manifold. The upstream and downstream manifolds are positioned out of the ground. More than one heat exchange flow circuit is connected to the upstream and downstream manifolds for burial in the ground.

The present invention can additionally include a method of exchanging heat with a ground source heat exchange system including providing an upstream manifold, and providing a downstream manifold. More than one heat exchange flow circuit can be connected to the upstream and downstream manifolds. The heat exchange flow circuits are buried in the ground. A control valve associated with each heat exchange flow circuit is mounted on at least one of the manifolds. Each control valve controls the flow of heat exchange fluid through respective heat exchange flow circuits where heat is exchanged between the heat exchange fluid and the ground.

The present invention can further include a method of exchanging heat with a ground source heat exchange system including providing an upstream manifold, and providing a downstream manifold. The upstream and downstream manifolds are positioned out of the ground. More than one heat exchange flow circuit is connected to the upstream and downstream manifolds. The heat exchange flow circuits are buried in the ground. Heat is exchanged between the heat exchange fluid and the ground.

BRIEF DESCRIPTION OF THE DRAWINGS

The foregoing and other objects, features and advantages of the invention will be apparent from the following more particular description of preferred embodiments of the invention, as illustrated in the accompanying drawings in which like reference characters refer to the same parts throughout the different views. The drawings are not necessarily to scale, emphasis instead being placed upon illustrating the principles of the invention.

DETAILED DESCRIPTION OF THE INVENTION

Figure 1:
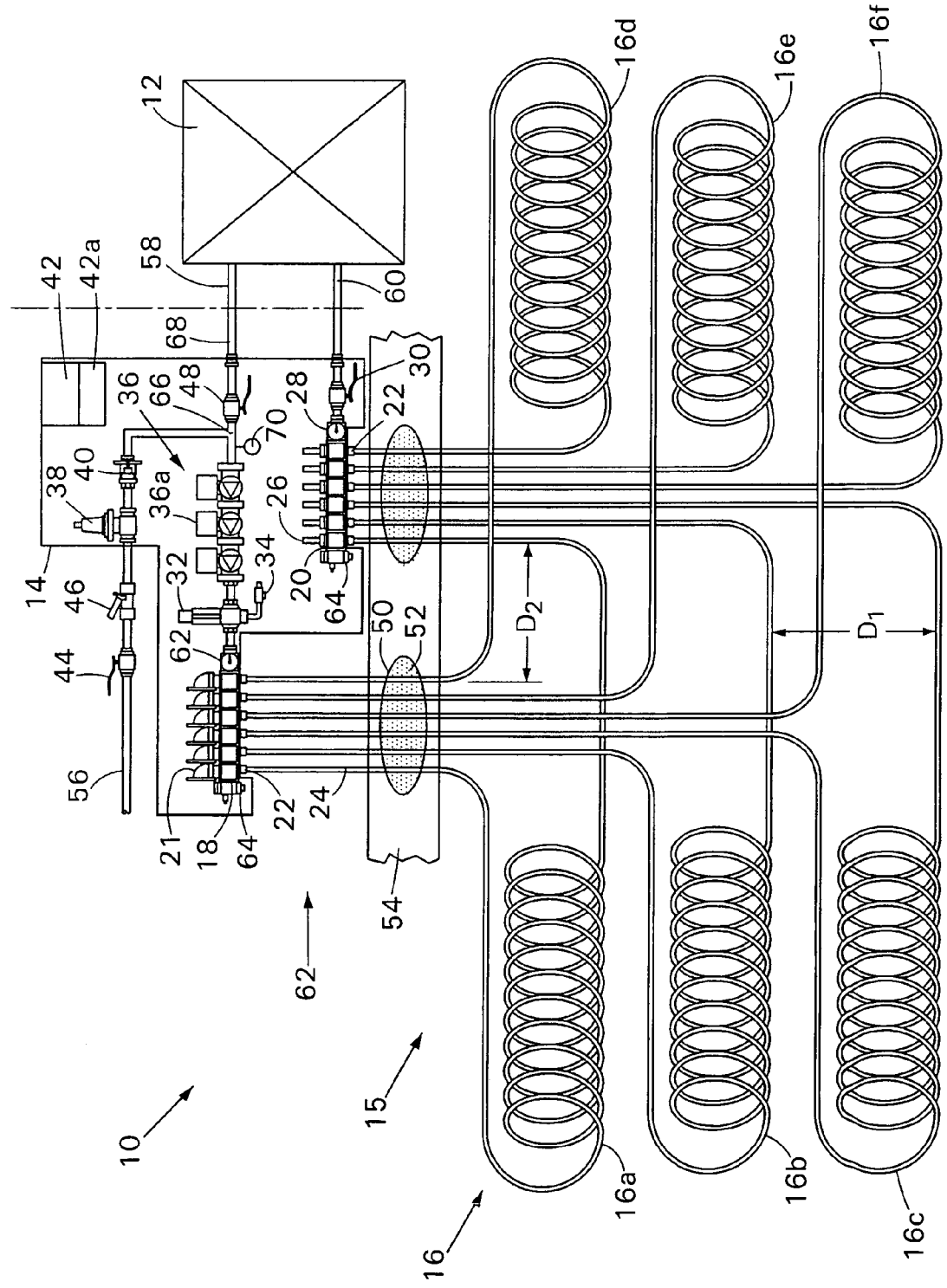
FIG. 1 depicts a schematic drawing of an embodiment of a ground source heat exchange system connected to a heat pump.
Figure 2:
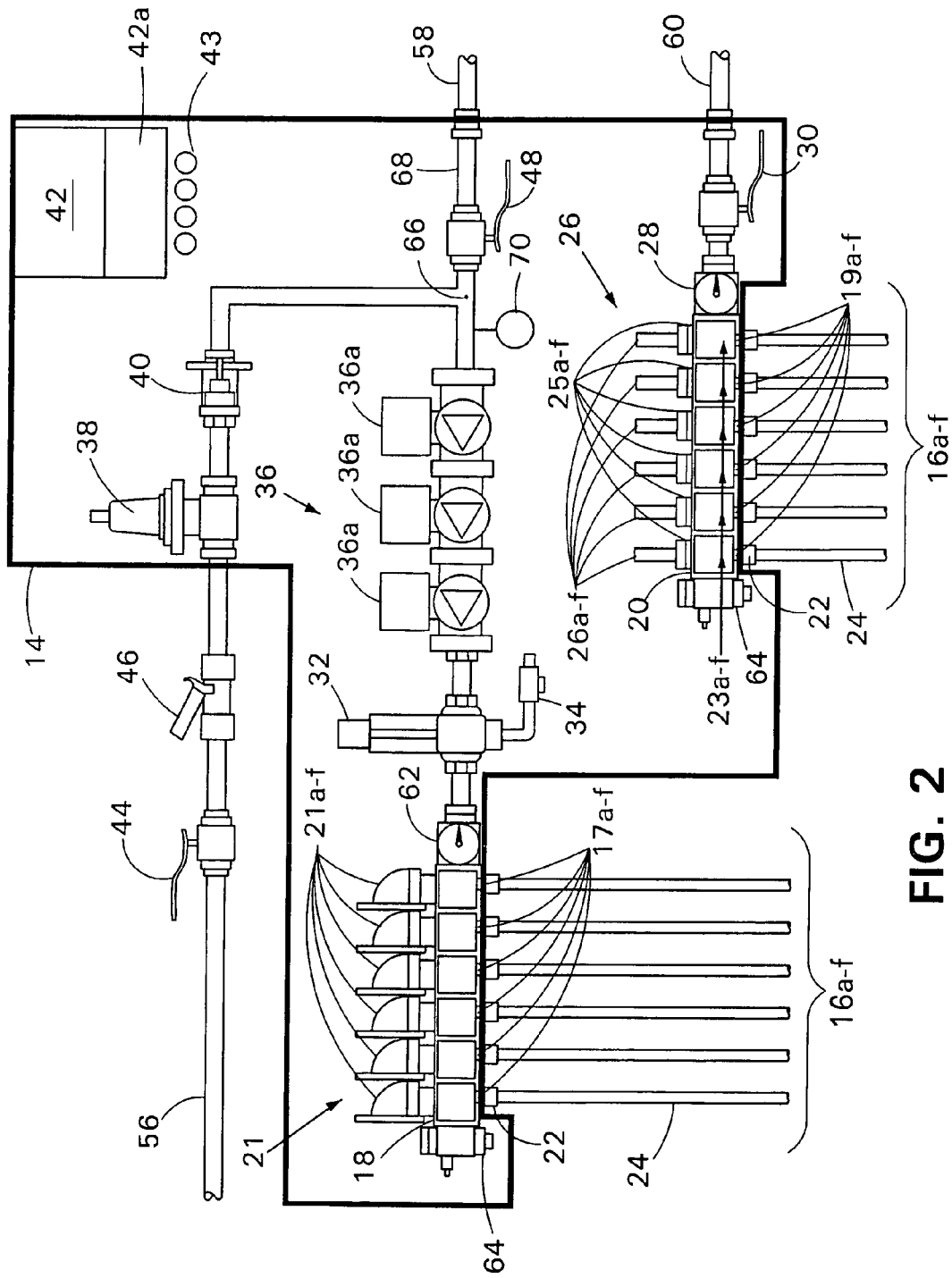
FIG. 2 is a schematic drawing of the cabinet for the ground source heat exchange system of FIG. 1.

Referring to FIGS. 1 and 2, heat exchange system 10 includes an apparatus 12 that operates using the exchange of heat, such as a heat pump, and a ground based heat exchange system 15 coupled to the heat pump 12. The ground based heat exchange system 15 includes a recirculating loop 68 having an upstream manifold 18 and a downstream manifold 20. The manifolds 18 and 20 are positioned above ground within the interior 62 of a structure or building, for example, in the basement. A heat exchange flow circuit system 16 formed of a series of individual heat exchange flow circuits, for example, 16a, 16b, 16c, 16d, 16e and 16f, are connected between the upstream 18 and downstream 20 manifolds. The flow circuits 16a-16f can be formed of tubing 24, such as flexible plastic tubing. Each flow circuit 16a-16f extends from the upstream manifold 18 through the wall 54 of the structure, such as the basement wall, into the ground and returns through the wall 54 to the downstream manifold 20. Heat exchange fluid, such as an antifreeze mixture, flows from the upstream manifold 18 into each individual flow circuit 16a-16f. As the heat exchange fluid flows through each flow circuit 16a-16f, the heat exchange fluid exchanges heat with the ground and changes temperature. Depending upon whether the heat pump 12 is being used for cooling or heating, the heat exchange fluid can be heated or cooled by the ground. The downstream manifold 20 provides the cooled or heated heat exchange fluid to the heat pump 12 through an input line 60 for heat exchange in a heat exchanger within the heat pump 12. An output line 58 returns the heat exchange fluid from the heat pump 12 after heat exchange in the heat pump 12 where heat is added or removed from the heat exchange fluid by the heat pump 12. A pump system 36 is coupled to the output line 58 for pumping the heat exchange fluid back to the upstream manifold 18, thereby completing the recirculating loop 68.

The downstream manifold 20 has a flow adjuster or control valve system 26 including a series of flow adjusters or control valves 26a, 26b, 26c, 26d, 26e and 26f mounted on the manifold 20 for controlling the flow of the heat exchange fluid received from each heat exchange flow circuit 16a-16f. As a result, the flow rate through each flow circuit 16a-16f can be adjusted to optimize heat exchange with the ground, or some of the flow circuits 16a-16f can be completely closed. The pumping speed of the pump system 36 can be varied to provide further adjustment of the flow rate in the flow circuits 16a-16f.

A more detailed description of the heat exchange system 10 now follows. An input fill line 56 can be connected to the recirculating loop 68 at a tee 66 for filling the recirculating loop 68 with liquid, such as water from a domestic water line for diluting the antifreeze mixture to the desired level and to keep the system filled. The input fill line 56 can have a pressure regulator 38 for regulating the input pressure, which can be set to about 25 lbs./in.$^2$. A check valve 40 can be positioned downstream from the pressure regulator 38 and before the tee 66 to prevent flow from the recirculating loop 68 back into the water supply. A backflow preventer 46 can also be positioned upstream of the pressure regulator 38. The check valve 40 and the backflow preventer 46 can provide a dual check to prevent toxic chemicals from entering the domestic water supply. A shutoff valve 44, such as a ball valve, can be included in the input fill line 56, such as upstream of the backflow preventer 46, to close off entry of water into the recirculating loop 68 once the recirculating loop 68 has been filled. In some situations, it can be desirable to have valve 44 open so that the recirculating loop 68 can be automatically filled if there is a pressure drop or loss of fluid. When flushing and/or filling the recirculating loop, a flush cart having an expansion tank can be connected to the system which can then be left in place as part of the system.

The pump system 36 can be located in the recirculating loop 68 downstream from the tee 66, and can include more than one variable speed pump 36a, for example, three are shown in series. Alternatively, the pumps 36a can be in parallel. The size and number of the pumps 36a in the pump system 36 can depend upon the size of the heat exchange flow circuit system 16 as well as the diameter of the tubing 24, or the possibility of later adding additional flow circuits to the flow circuit system 16.

An air eliminator or separator 32 can be positioned in the recirculating loop 68 between the pump system 36 and the upstream manifold 18 for removing air bubbles circulating within the recirculating loop 68. The removal of the air bubbles can optimize the heat transfer capability of the fluid and eliminate air pockets which could restrict fluid flow. The air eliminator 32 can include a pressure relief valve 34 for releasing heat exchange fluid if the pressure within the recirculating loop 68 becomes too high in order to protect components within the heat exchange system 15 from damage, and to allow air to escape when initially filling the system. The air eliminator 32 in some embodiments can be positioned upstream of the pump system 36 between the pump system and the tee 66.

An upstream temperature monitor or sensor 62 can be positioned within the recirculating loop 68 adjacent to the upstream manifold 18 for monitoring or sensing the temperature of the heat exchange fluid prior to entry into the heat exchange flow circuit system 16.

The upstream manifold 18 of the recirculating loop 68 distributes the fluid from a single flow path to multiple outlet ports on the manifold 18, for example, 17a, 17b, 17c, 17d, 17e and 17f for directing the heat exchange fluid into the desired heat exchange flow circuits 16a-16f which are connected to the respective outlet ports 17a-17f. The upstream manifold 18 can have a flush/fill valve 64 to aid in flushing or filling the recirculating loop 68 with liquid. A shutoff valve system 21, for example, having shutoff valves 21a, 21b, 21c, 21d, 21e and 21f, can be optionally mounted to the upstream manifold 18 for opening or closing flow through any selected ports 17a-17f and the respective flow circuits 16a-16f. The shutoff valves 21a-21f can be manual or electronically controlled.

In one embodiment, the tubing 24 of each heat exchange flow circuit 16a-16f can have compression or quick connect fittings 22 on opposite ends for engaging and quickly connecting with respective outlet ports 17a-17f on the upstream manifold 18, and the multiple inlet ports 19a, 19b, 19c, 19d, 19e and 19f on the downstream manifold 20. The flow circuits can be made of a continuous length of tubing 24 that is poly or PEX tubing, which is shipped to the installation site from the factory with a premeasured amount of concentrated antifreeze contained therein. The concentrated antifreeze can be later diluted by adding water through the input fill line 56. The compression fittings 22 seal the concentrated antifreeze within the flow circuits 16a-16f during shipping. The compression fittings 22 can include control valves. Only when the compression fittings 22 engage the ports 17a-17f and 19a-19f of the upstream 18 and downstream 20 manifolds, is the antifreeze able to flow from the flow circuits 16a-16f. If the compression fittings 22 include control valves, such valves must be open for the antifreeze to flow. As a result, the flow circuits 16a-16f can be installed without welding to knuckles and without requiring licensed personnel, while at the same time reducing the possibility of contamination in the system. In addition, the fittings 22 or tubing 24 of the flow circuits 16a-16f can be color coded or numbered to correspond to color coded or numbered ports 17a-17f and 19a-19f on the upstream 18 and downstream 20 manifolds so that the flow circuits 16a-16f can be easily connected to the proper locations.

In one embodiment, each heat exchange flow circuit 16a-16f can include ½" diameter non-cross linked poly or PEX tubing that can be up to about 1500 feet long. When the tubing 24 has a diameter of ½ to ¾ inch, the pump system 36 can handle filling and flushing the heat exchange system 15 without the aid of a large flush/fill auxiliary pump. Such an auxiliary pump is typically required when tubing 24 is larger. In various embodiments, the flow circuits 16a-16f can have different diameter tubing as desired, such as ½", ⅜", ⅝" or ¾".

The heat exchange flow circuits 16a-16f can extend through the wall 54 of a structure, such as the basement wall to and from the manifolds 18 and 20, through a pipe 50 filled with insulating material 52, such as foam or other suitable materials. The flow circuits 16a-16f can be buried in trenches in the ground, for example, about 3-6 feet deep. The tubing 24 of each flow circuit 16a-16f can be looped as shown and are spaced apart in the lateral direction a distance $D_1$ that is preferably at least 10 feet. The minimum distance $D_2$ between the exit and inlet points of the flow circuits 16a-16f through the wall 54 is preferably at least 4 feet. In one embodiment, the flow circuits 16a-16f can be configured relative to each other as shown in FIG. 1, but it is understood that a variety of layouts or closed circuit configurations are possible, for example, in vertically drilled wells or submerged laterally under water. In addition, it is understood that the upstream 18 and downstream 20 manifolds can include extra ports so that the flow circuit system 16 can be expanded later to include additional flow circuits. Assemblies can be interconnected for large applications.

The downstream manifold 20 of the recirculating loop 68 recombines the multiple flow paths of the flow circuits 16a-16f into a single flow path for delivery into the heat pump 12. The multiple inlet ports of the downstream manifold 20, for example, 19a, 19b, 19c, 19d, 19e and 19f, are connected to respective heat exchange flow circuits 16a-16f for receiving heat exchange fluid. The control valves 26a-26f control the flow rate of fluid received from each port 19a-19f. It is possible to have no flow from some ports 19a-19f, or varied flow from each port. The downstream manifold 20 can also include a series of flow monitors or sensors 23a, 23b, 23c, 23d, 23e and 23f for monitoring or sensing the flow rate as controlled by the respective control valves 26a-26f. In one embodiment, the control valves 26a-26f are hand controlled, and in other embodiments are electronically controlled. A series of temperature monitors or sensors 25a, 25b, 25c, 25d, 25e and 25f can also be included at the downstream manifold 20 for monitoring or sensing the temperature of the fluid received from each respective flow circuit 16a-16f. The optimum efficiency occurs when the heat exchange fluid passing through each flow circuit 16a-16f is a calculated average temperature, for example, there can be a temperature change of about 8° F. between the entry and exit of the flow circuit. In addition, there can be a preset flow rate between 1.5-4 gpm/ton of heat extracted by the heat pump 12. The combined temperature of the heat exchange fluid from all the flow circuits 16a-16f can be monitored or sensed by a temperature monitor or sensor 28 in the recirculating loop 68 downstream from the downstream manifold 20. The downstream manifold 20 can also have a flush/fill valve 64 similar to the upstream manifold 18. The upstream 18 and downstream 20 manifolds can be a manifold block or can be formed from a length of tubing, for example, copper tubing in which the various features are formed and components attached.

The recirculating loop 68 also can have shutoff valves 30 and 48 upstream and downstream from the heat pump 12 for isolating the heat pump 12, for example, for repairs. The input line 60 brings the heat exchange fluid to a heat exchanger in the heat pump 12 and the output line 58 returns the heat exchange fluid out of the heat pump 12 back towards the upstream manifold 18. In some embodiments, a flush port with a shutoff valve can be connected to the input line 60 to facilitate flushing or filling of the system fluid. For example, antifreeze in the system can be diluted through the input fill line 56 into a flush cart and return to the flush port connected to the input line 60. In addition, an expansion tank can be connected to the output line 58 to regulate fluid pressure. The expansion tank can also be connected at other suitable locations.

The pressure regulator 38, check valve 40, shutoff valves 30, 48, pump system 36, air eliminator 32, temperature monitors 62 and 28, and manifolds 18 and 20 with the attached components, can be enclosed within a cabinet 14 that is above or out of the ground, for example, within the basement of a structure (above or out of the ground meaning that the components are not permanently buried in the ground). As a result, most of the components of the ground based heat exchange system 15 are located in the cabinet 14 which allows easy access for monitoring the system 15 and for repair. In addition, virtually all the connections or joints can be made inside where the temperature does not fluctuate greatly so that the connection joints do not undergo stresses caused by outdoor temperature changes. As shown in FIG. 1, by being connected to manifolds 18 and 20 indoors, the heat exchange flow circuits 16a-16f can be buried in the ground without having any connections or joints outdoors or in the ground. This can reduce damage to the flow circuits 16a-16f and reduce the formation of leaks or failure.

Figure 3:
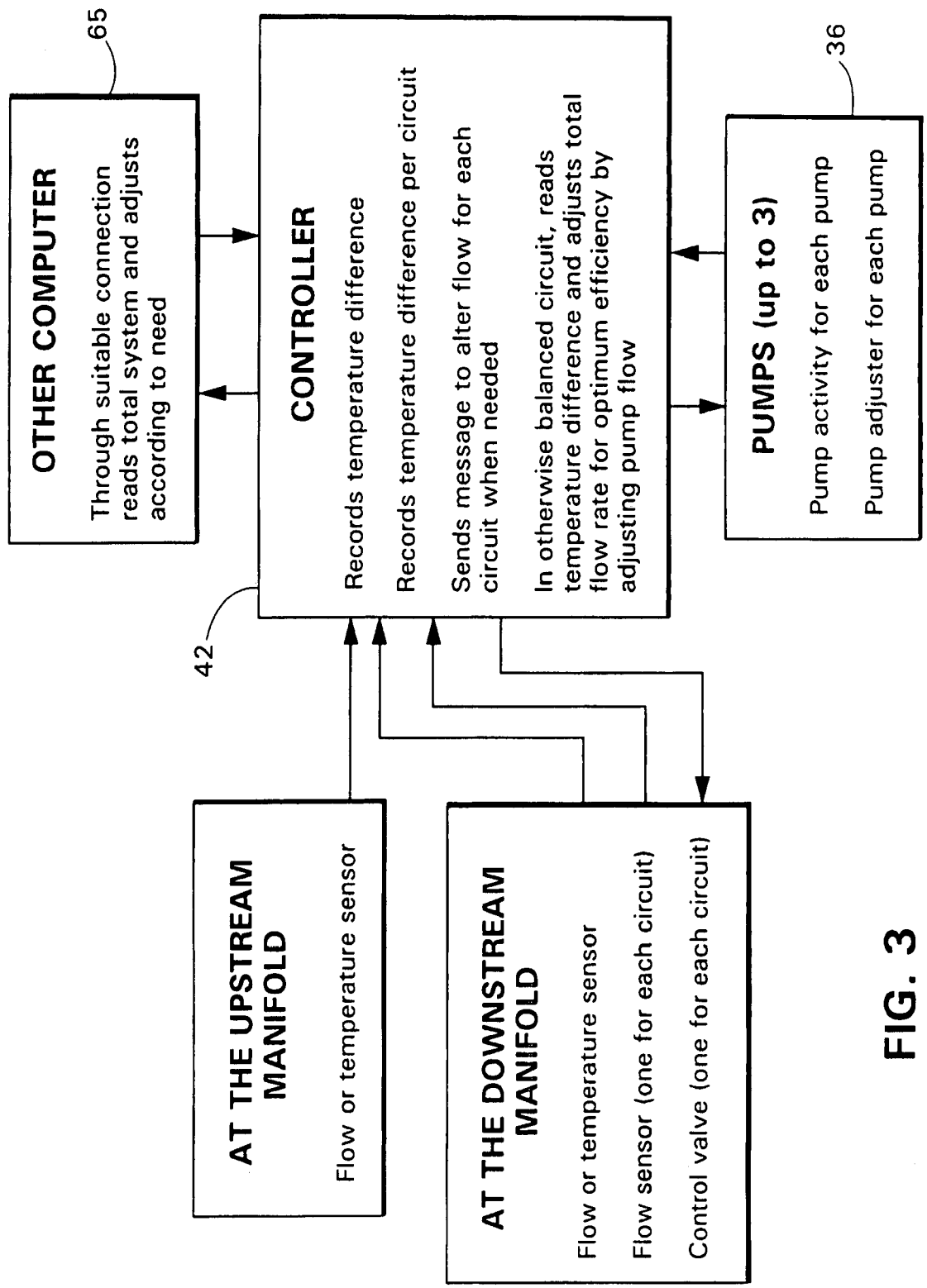
FIG. 3 is a flow diagram depicting the operation of an embodiment of the ground source heat exchange system with the controller.

The pump system 36 and control valve system 26 can be electronically connected to and controlled by a controller 42 located within or outside the cabinet 14. The controller 42 can automatically control the speed of the pump system 36 as well as the flow rates through the heat exchange flow circuits 16a-16f via control valves 26a-26f so that the heat exchange ability of the heat exchange flow circuit system 16 can be optimized. The temperature monitors 62, 28 and 25a-25f, as well as the flow monitors 23a-23f, can also be electrically connected to the controller 42 for providing the controller 42 with any of the temperatures of the fluid before entering the flow circuits 16a-16f, the temperature of the fluid received from each flow circuit 16a-16f after passing through the ground, the combined temperature of the fluid from flow circuits 16a-16f after being mixed together, and the flow rates from each flow circuit 16a-16f. Based upon all or some of this information, the controller 42 can automatically adjust the speed of the pump system 36 and the amount that each control valve 26a-26f is opened or closed to maintain an maximum average heat exchange temperature difference. The monitors 62, 28, 25a-25f and 23a-23f can have indicators that can be visually read within the cabinet 14. In addition, the information from these monitors can be displayed on a display screen 42a on the controller 42. The display screen 42a can also provide other information regarding the operation of the heat exchange system 10. The controller 42 can be connected to another computer system 65 via cable, telephone or internet to report information, or to obtain any of information, software and instructions for correcting or solving problems, or to call for service, such as if the system shuts down. The operation of the system 15 by controller 42 in one embodiment can be seen in FIG. 3. The cabinet 14 and/or the controller 42 can include indicator lights to indicate normal operation and/or problems, for example, low pressure, which might indicate a leak. An optimal pressure monitor or sensor 70 can be coupled to the recirculating loop 68 and electrically connected to the controller 42 to provide such information. In addition, pressure monitors or sensors can be connected to each flow circuit 16a-16f.

In some embodiments, the heat exchange flow circuit system 16 can be installed with an extra number of flow circuits, where under normal operation, only some of the flow circuits are operated. However, in times of need, the control valves controlling the unused flow circuits can be opened. This can also be used to address the possibility of one or more flow circuits developing leaks or blockages over time. In such a situation, valves 21a-21f can be electronically controlled and connected to controller 42. As a result, if a flow circuit system 16 having flow circuits 16a-16f is using flow circuits 16a-16e, with flow circuit 16f being unused, and a particular flow circuit 16c develops a leak or blockage, the controller 42 will notice the lack of flow through the flow circuit 16c. The controller 42 can then close valves 21c and 26c at opposite ends of flow circuit 16c to close off and isolate flow circuit 16c and then open up valves 21f and 26f to open up flow circuit 16f for use. If the system 15 uses pressure monitors, the decision can be made based on the loss of pressure.

While this invention has been particularly shown and described with references to preferred embodiments thereof, it will be understood by those skilled in the art that various changes in form and details may be made therein without departing from the scope of the invention encompassed by the appended claims. For example, although the tubing 24 for the heat exchange flow circuits has been described as plastic tubing, other types of tubing such as metallic tubing can be employed. In addition, the flow circuits do not have to be formed of tubing, for example, can be molded flow circuit components. It is understood that the number of the flow circuits can vary as well as the size of the manifolds 18 and 20, and the number of ports. Furthermore, although the heat exchange fluid is preferably an antifreeze mixture, the heat exchange fluid can be other fluids, such as fresh water, brine, cooling oil, etc. The system can be connected directly to compressors in heat pumps and used in D.X. systems. Although tubing 24 has been described with compression fittings, alternatively, fusion type fittings or glue can be employed.

What is claimed is:

1. A ground source heat exchange system comprising:
   an upstream manifold;
   a downstream manifold, the upstream and downstream manifolds being positioned out of the ground;
   more than one heat exchange flow circuit connected to the upstream and downstream manifolds for burial in the ground, the upstream manifold distributing a single flow path of heat exchange fluid into multiple flow paths into the more than one heat exchange flow circuit, and the downstream manifold recombining the multiple flow paths;
   a control valve associated with each said more than one heat exchange flow circuit mounted on at least one of the manifolds, each control valve for controlling flow of heat exchange fluid through a respective heat exchange flow circuit;
   more than one downstream temperature monitor, each associated with a respective more than one heat exchange flow circuit for separately monitoring the temperature of the heat exchange fluid exiting each individual heat exchange flow circuit;
   more than one flow monitor, each associated with a respective more than one heat exchange flow circuits for separately monitoring the flow of the heat exchange fluid through each heat exchange flow circuit;
   a combined flow downstream temperature monitor positioned downstream from the downstream manifold for monitoring the temperature of the combined heat exchange fluid of the heat exchange flow circuits; and
   a controller in communication with each of the control valves, temperature monitors and flow motors, the controller capable of adjusting the control valves and the flow through each heat exchange flow circuit to obtain a maximum combined heat exchange based upon the monitored temperatures of the heat exchange fluid exiting each heat exchange flow circuit, the monitored flow of the heat exchange fluid through each heat exchange flow circuit, and the monitored temperature of the combined heat exchange fluid from all the heat exchange flow circuits.

2. The system of claim 1 in which the manifolds are manifold blocks.

3. The system of claim 1 in which the heat exchange flow circuits each comprise a length of flexible plastic tubing.

4. The system of claim 3 in which the flexible plastic tubing is ½ inch diameter crosslinked polyethylene tubing.

5. The system of claim 3 in which each heat exchange flow circuit further comprises compression fittings on opposite ends of the length of tubing for connecting with the upstream and downstream manifolds.

6. The system of claim 5 in which each length of tubing is filled with a premeasured amount of antifreeze which is sealed within the tubing by the compression fittings until connection with the manifolds.

7. The system of claim 1 further comprising a pump system in communication with the upstream and downstream manifolds for pumping the heat exchange fluid through the system.

8. The system of claim 7 in which the pump system can include more than one variable speed pump coupled together in series.

9. The system of claim 8 further comprising a cabinet positioned out of the ground, the cabinet containing the manifolds, pump system and control valves for access.

10. The system of claim 9 further comprising an input line for filling the system with liquid.

11. The system of claim 10 further comprising an input pressure regulator coupled to the input line for regulating entry pressure of said liquid.

12. The system of claim 7 in which the controller is in communication with the pump system and is capable of optimizing flow rate and heat transfer.

13. The system of claim 12 in which any one of an air eliminator, the temperature monitors, the input pressure regulator, the flow monitors and the controller are positioned within the cabinet.

14. The system of claim 1 further comprising an air eliminator for removing air in the system.

15. The system of claim 1 in which the control valves are electrically controlled.

16. The system of claim 1 further comprising a heat pump, the heat pump receiving the heat exchange fluid from the downstream manifold and returning the fluid to the upstream manifold.

17. The system of claim 1 further comprising a flush cart connected to the system for flushing and or filling the system.

18. The system of claim 1 in which said more than one heat exchange flow circuit includes at least one auxiliary heat exchange flow circuit.

19. A ground source heat exchange system comprising:
   an upstream manifold block;
   a downstream manifold block, the upstream and downstream manifolds being positioned out of the ground;
   more than one heat exchange flow circuit connected to the upstream and downstream manifolds for burial in the ground, the upstream manifold distributing a single flow path of heat exchange fluid into multiple flow paths into the more than one heat exchange flow circuit, and the downstream manifold recombining the multiple flow paths;

a pump system in communication with the upstream and downstream manifold blocks for pumping the heat exchange fluid through the system;

a control valve associated with each said more than one heat exchange flow circuit mounted on at least one of the manifold blocks, each control valve for controlling flow of heat exchange fluid through a respective heat exchange flow circuit;

a cabinet positioned out of the ground, the cabinet containing the manifolds, pump system and control valves for easy access;

more than one downstream temperature monitor, each associated with a respective more than one heat exchange flow circuit for separately monitoring the temperature of the heat exchange fluid exiting each heat exchange flow circuit;

more than one flow monitor, each associated with a respective more than one heat exchange flow circuits for separately monitoring the flow of the heat exchange fluid through each heat exchange flow circuit;

a combined flow downstream temperature monitor positioned downstream from the downstream manifold for monitoring temperature of the combined heat exchange fluid of the heat exchange flow circuits; and a controller in communication with each of the control valves, temperature monitors and flow monitors, the controlled capable of adjusting the control valves and the flow through each heat exchange flow circuit to obtain a maximum combined heat exchange based upon the monitored temperatures of the heat exchange fluid exiting each heat exchange flow circuit, the monitored flow of the heat exchange fluid through each heat exchange flow circuit, and the monitored temperature of the combined heat exchange fluid from all the heat exchange flow circuits.

* * * * *